United States Patent
Mahajan et al.

(10) Patent No.: US 9,312,570 B2
(45) Date of Patent: Apr. 12, 2016

(54) ALLOWING A COMPUTING DEVICE TO OPERATE IN A DEMO MODE AND A CONSUMER MODE

(71) Applicant: VERIZON PATENT AND LICENSING INC., Arlington, VA (US)

(72) Inventors: Amit Mahajan, Bridgewater, NJ (US); Farook Kaleem, Piscataway, NJ (US); Dae-Sub Nam, Warren, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 151 days.

(21) Appl. No.: 14/304,505

(22) Filed: Jun. 13, 2014

(65) Prior Publication Data

US 2015/0363207 A1    Dec. 17, 2015

(51) Int. Cl.
*G06F 1/26* (2006.01)
*H01M 10/42* (2006.01)

(52) U.S. Cl.
CPC .............. *H01M 10/42* (2013.01); *G06F 1/263* (2013.01)

(58) Field of Classification Search
CPC ........ G06F 1/263; H01M 10/42; H02J 7/0075
See application file for complete search history.

(56) References Cited

U.S. PATENT DOCUMENTS

| | | | |
|---|---|---|---|
| 2002/0097022 A1* | 7/2002 | Saeki | H02J 7/045 320/125 |
| 2011/0090401 A1* | 4/2011 | Candelore | G06Q 30/0241 348/563 |
| 2013/0049704 A1* | 2/2013 | Andou | G06F 1/266 320/162 |
| 2015/0245722 A1* | 9/2015 | Sanford | A47F 3/005 434/379 |

* cited by examiner

*Primary Examiner* — Albert Wang

(57) ABSTRACT

Systems and methods for a demo mode for a computing device are disclosed. In some implementations, a computing device receives a first input for entering a demo mode. The computing device prompts, in response to the first input, for a user input indicating whether the user wishes to place the computing device in the demo mode. The computing device receives the user input indicating that the user wishes to place the computing device in the demo mode. The computing device enters the demo mode responsive to the user input indicating that the user wishes to place the computing device in the demo mode. Entering the demo mode includes adjusting battery settings of the computing device.

20 Claims, 6 Drawing Sheets

ALLOWING A COMPUTING DEVICE TO OPERATE IN A DEMO MODE AND A CONSUMER MODE

BACKGROUND

Oftentimes, customers like to examine and play with computing devices, such as tablet computers or mobile phones, before purchasing the computing devices. Playing with the computing devices allows the customers to become familiar with the computing device(s) and their feature, and may make them more comfortable with the purchase decision. In this connection, computing device retailers often have "demo" computing devices in their stores. These "demo" computing devices may be special ordered demo mode devices from the manufacturer, which repeatedly play a video showing key applications and features of the computing device. These demo devices may not be suitable for retail sale to a customer, as they may have demo software in place of customer software. As a result, retailers waste money on purchasing demo devices, which cannot be resold to customers. As the foregoing illustrates, a new approach for providing "demo" computing devices, which would allow demo computing devices to be re-sold to customers and/or returned customer devices to be used as demo computing device, may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
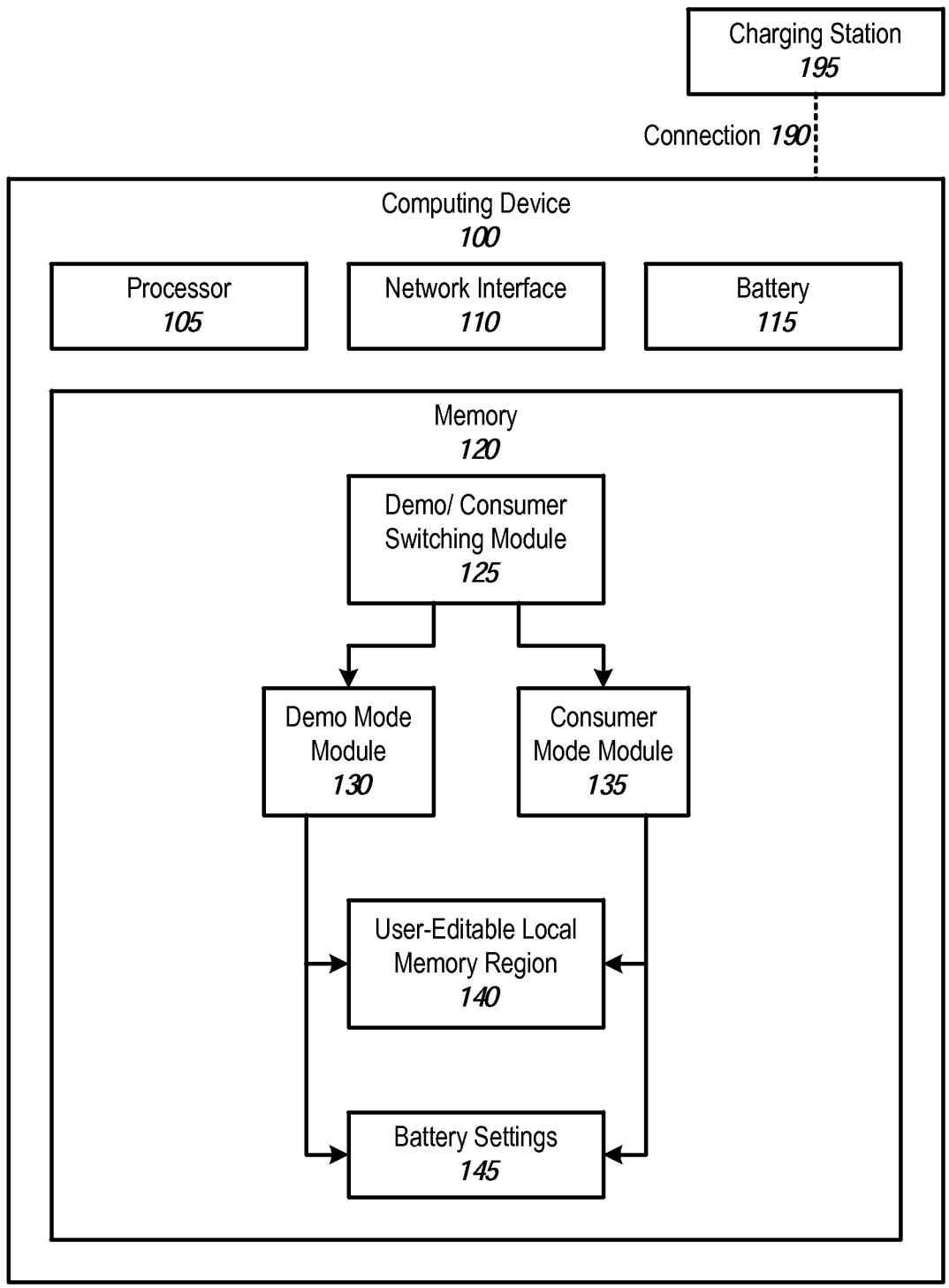
FIG. 1 illustrates an exemplary computing device configured to operate in a demo mode and a consumer mode.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The subject technology provides techniques for placing a computing device in a demo mode. According to some implementations, a computing device may be able to transition between a consumer mode and a demo mode, allowing a retailer to resell a former demo device or to use a returned or refurbished computing device as a demo device. As a result, the retailer may not need to special order a demo device from the manufacturer.

A computing device may receive a first input for entering the demo mode. The first input may include a cellular signal from a pico cell environment associated with a retail store, which may be detected within a radius (e.g., 50 meters) of the store, depending on the strength of the signal and the cellular radio in the computing device. In some cases, the first input may be a non-user based input that is received via a short-range radio (e.g., a Wi-Fi or a near field communication (NFC) radio) or a long-range radio (e.g., a cellular radio). Alternatively, the first input may include a preset security code for unlocking a user interface of the computing device. In some examples, the first input may include a near field communication (NFC) radio signal. In some examples, the first input may include a new subscriber identity module (SIM) card being placed in the computing device. The new SIM card may include an indication, written into the SIM card, that the computing device is to be placed in the demo mode. The first input may include the user registering a predetermined email address, for example, DEMO-MODE@CARRIER.COM, for receiving email at the computing device. The first input may be a beacon signal for entering the demo mode. A retail store may have a beacon system that identifies a computing device with which the beacon system is able to communicate and sends, to the computing device, the beacon signal instructing the computing device to enter the demo mode. In some cases, the beacon system may be able to communicate with device(s) within a radius, based on the strength of the beacon system's radio and the device's radio, of the beacon system. The beacon system may verify that a mobile equipment identifier (MEID) of the device corresponds to a device that does not belong to a consumer before placing the device in the demo mode.

In response to the first input, the user of the computing device may be prompted to indicate whether he/she wishes to place the computing device in the demo mode. The user may be notified that placing the computing device in the demo mode includes erasing the local memory and all user-adjusted settings from the computing device. In response, the user may provide an input indicating that the user wishes to place the computing device in the demo mode. For example, the user may be presented with the prompt "Do you wish to place the computing device in demo mode?" and offered to press a "Yes" button or a "No" button, where "Yes" corresponds to placing the computing device in demo mode, and "No" corresponds to foregoing placing the computing device in demo mode. If the user does not enter any input in response to the prompt, the computing device may lock and not allow any other changes until the user enters an input responsive to the prompt. In some cases, a safety mechanism may be provided. The safety mechanism may include, for example, providing an "undo" button for a predetermined time period (e.g., five minutes or ten minutes) after entering the demo mode. The predetermined time period may be set by a manufacturer or a programmer of the computing device.

The computing device may enter the demo mode in response to the user input indicating that the user wishes to place the computing device in the demo mode. Entering the demo mode may include restarting an operating system of the computing device in the demo mode, erasing all or a portion of the local memory of the computing device, and adjusting the battery settings of the computing device, as described in greater detail below. After the computing device is placed in the demo mode, a factory reset of the computing device may be required to exit the demo mode.

When not in the demo mode (i.e., when in a consumer mode) the computing device may operate under normal battery settings, which include charging the battery whenever the computing device is plugged in and the battery is not fully charged. However, when the computing device is in the demo mode, it is oftentimes plugged in and physically connected to a wall or a table to prevent theft. As a result of the frequent charging, the battery may be damaged. As the foregoing illustrates, a new battery management technique for devices in the demo mode may be desirable. The new battery management technique may be used when the computing device is in demo mode and when the computing device is plugged into a charging station (e.g., a wall charger or a universal serial bus (USB) charger).

The battery management technique may include determining a battery charge level of the computing device. The battery charge level corresponds to a percentage of the full power supply of the battery that is presently stored in the battery and is oftentimes displayed on a computing device proximate to a top or bottom edge of the screen.

According to the battery management technique, in response to determining that the computing device is in the demo mode and plugged into the charging station, if the battery charge level of the computing device is at or above a first threshold (e.g., 35%), the computing device may stop charging the battery from the charging station. If the battery charge level falls to at or below a second threshold (e.g., 30%), the computing device may restart charging the battery from the charging station. The first threshold and the second threshold may be set by a manufacturer or a programmer of the mobile device based on characteristics of the battery of the mobile device. The characteristics of the battery may include an optimal charging frequency, and a charge range where the computing device does not automatically enter "power saving" mode. The characteristics of the battery may be provided by a manufacturer of the battery or the manufacturer of the computing device. If the computing device is plugged in and the battery is not being charged, power for operating the computing device may be consumed from the charging station. The battery may be used if the power from the charging station is insufficient. In summary, if the computing device is plugged in and in demo mode, if the charge of the battery is at or above the first threshold, the battery is not charged and, if possible, the power for operating the computing device is taken from the charging station. A switch within the circuitry that is controlled by the processor may be used to effect this change. The switch may allow power to be provided to either the battery, the hardware (e.g., processor, network interface, etc.) of the computing device, or both the battery and the hardware. If the charge of the battery is at or below the second threshold, the battery is charged using the charging station. If the charge of the battery is between the first and second threshold and the battery was previously not charging, charging of the battery is not started until the battery discharges to the second threshold. If the charge of the battery is between the first and second threshold and the battery was previously charging, charging of the battery continues until the battery's charge level reaches the first threshold.

FIG. 1 illustrates an exemplary computing device 100 configured to operate in a demo mode and a consumer mode. The computing device 100 may be a mobile phone, a tablet computer, a laptop computer, a desktop computer, a personal digital assistant (PDA), a digital music player, etc. As shown, the computing device 100 includes a processor 105, a network interface 110, a battery 115, and a memory 120. The processor 105 executes instructions stored in a computer-readable medium, such as the memory 120. While a single processor 105 is illustrated, the computing device 100 may include multiple processors. The multiple processors may be arranged in processing unit(s), such as a central processing unit (CPU), a graphics processing unit (GPU), etc. The network interface 110 allows the computing device 100 to send and receive data in a network, such as the network described below in conjunction with FIG. 4. The network interface 110 may include one or more network interface controllers (NICs).

The battery 115 stores electric power which may be provided to the processor 105, the network interface 110, or the memory 120 for operation of the computing device 100. The battery 115 may be charged by connecting to a charging station 195 using a connection 190. In some cases, the computing device 100 may be operated without the battery 115 by connecting the computing device 100 to the charging station 195 using the connection 190 and powering the computing device 100 using the connection 190 to the charging station 195. The charging station 195 may be a wall charger or a universal serial bus (USB) charger, and the connection 190 may be a wired connection. Alternatively, the charging station 195 may be a wireless charging station and the connection 190 may be a wireless connection.

The memory 120 stores data and/or instructions. The memory 120 may include a cache unit, a storage unit, a long-term memory or a short-term memory. As shown, the memory 120 stores a demo/consumer switching module 125, a demo mode module 130, a consumer mode module 135, a user-editable local memory region 140, and battery settings 145.

The user-editable local memory region 140 includes data stored at the computing device 100 by the user of the computing device 100. The user-editable memory region may include, for example, application(s) and file(s). The file(s) may include photographs, videos, audio recordings, text documents, email messages, short messaging service (SMS) messages, etc.

The battery settings 145 store settings for the operation and management of the battery. The battery settings 145 may be adjusted based on whether the computing device is in a demo mode or a consumer mode. Consumers oftentimes charge the computing device 100 once per day (e.g., at night) and then forego charging the computing device 100 for extended periods of time (e.g., 12 hours). Thus, when the computing device 100 is in a consumer mode, the battery settings 145 may include charging the computing device 100 whenever the computing device 100 is connected to the charging station 195 via the connection 190. However, the computing device 100 in a demo mode may be connected to a fixed object (e.g., a wall or a table) to prevent theft of the computing device 100. Thus, the computing device 100 in a demo mode may be connected to the charging station 195 more frequently, causing damage to the battery 115 due to the frequent and continued charging. In some cases, foregoing charging the computing device 100 when it is connected to the charging station 195 and in the demo mode therefore may be desirable.

One example of the battery settings 145 may include, when the computing device 100 is connected to the charging station 195 and in the demo mode: charging the battery 115 if the battery charge level is at or below a second threshold (e.g., 30% of full charge), and stopping charging the battery 115 if the battery charge level exceeds a first threshold (e.g., 35% of full charge). If the battery charge level is between the second threshold and the first threshold (e.g., between 30% and 35% of full charge) and the battery was previously being charged, charging continues. Otherwise, charging does not begin until the battery charge level reaches the second threshold. The battery settings 145 may include, when the computing device 100 is connected to the charging station 195 and in the demo mode, consuming power for operating the computing device from the charging station 195 and consuming power from the battery 115 upon determining that the power from the charging station 195 is insufficient. Power from the charging station 195 may be insufficient, for example, if the computing device 100 is engaged in a battery-intensive activity, for example, simultaneously: (1) presenting an image on the screen, (2) engaging in a cellular call via the network interface 110, and (3) processing the audio for the cellular call via a headset connected to the computing device 100 via a short-range radio (e.g., Bluetooth®). In another example, power from the charging station 195 may be insufficient if either the charging station 195 or the connection 190 is not capable of providing power to the battery 115 at a high rate of speed/current. As a result of these battery settings 145, the battery 115 may be charged less frequently when the computing device 100 is in the demo mode, reducing damage to the battery due to overcharging.

The demo/consumer switching module 125 includes instructions which, when executed by the processor 105, cause the processor to switch the computing device 100 between the demo mode and the consumer mode. One example of a process for entering a demo mode is described herein in conjunction with FIG. 2. Entering the consumer mode may include receiving a factory reset of the computing device 100 and entering the consumer mode responsive to the factory reset of the computing device 100.

The demo mode module 130 includes instructions which, when executed by the processor 105, cause the processor 105 to enforce the demo mode at the computing device 100. The demo mode module 130 may be executed in response to the computing device 100 entering the demo mode. Enforcing the demo mode may include enforcing the battery settings 145 associated with the demo mode and running demo applications or a demo presentation at the computing device 100. Enforcing the demo mode may also include clearing the user-editable local memory region 140 of the computing device 100.

The consumer mode module 135 includes instructions which, when executed by the processor 105, cause the processor 105 to enforce the consumer mode at the computing device 100. Enforcing the consumer mode may include enforcing the battery settings 145 associated with the consumer mode. Enforcing the consumer mode may also include allowing the user to access and modify data, including application(s) or file(s), stored in the user-editable local memory region 140.

Figure 2:
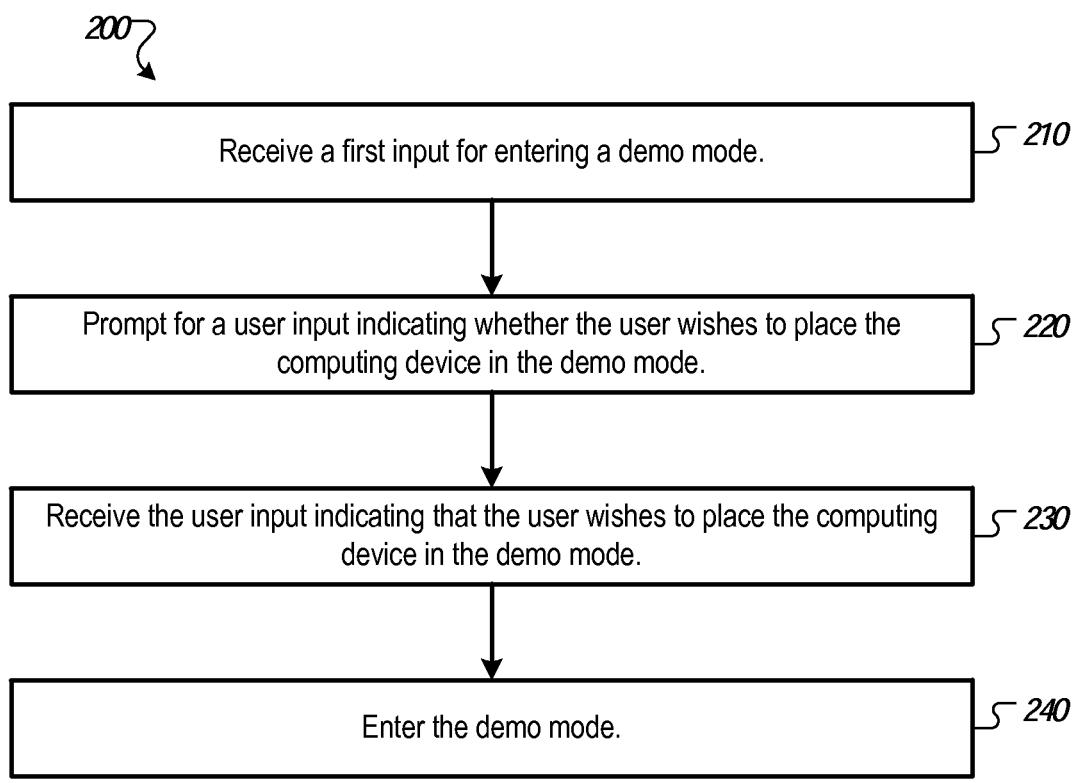
FIG. 2 is an exemplary process for entering a demo mode of a computing device.

FIG. 2 is an exemplary process 200 for entering a demo mode of a computing device. The process 200 begins at step 210, where the computing device (e.g., computing device 100) receives a first input for entering the demo mode. The first input may be a cellular signal from a pico cell environment associated with a retail store. The cellular signal from the pico cell environment may be detectable within a certain radius (e.g., 50 meters) from the retail store. The radius may be determined based on the strength of the cellular signal and the strength of the cellular network interface (e.g., network interface 110) in the computing device. The first input may be a preset security code for unlocking a user interface of the computing device. The first input may be a near field communication (NFC) radio signal. The first input may include a new subscriber identity module (SIM) card being inserted into the computing device, where the new SIM card includes an indication that the computing device is to be placed in the demo mode. The first input may include the user registering a predetermined email address, for example, DEMO-MODE@CARRIER.COM, for receiving email at the computing device. The first input may be a beacon signal for entering the demo mode. A retail store may have a beacon device that identifies a computing device with which the beacon system is able to communicate and sends, to the computing device, the beacon signal instructing the computing device to enter the demo mode.

In step 220, responsive to the first input, the computing device prompts for a user input confirming the user wishes to place the computing device in the demo mode. The prompt may be displayed on a screen of the computing device. The user may be requested to select a first button to confirm that he/she wishes for the computing device to be placed in the demo mode or to select a second button to indicate that he/she does not wish for the computing device to be placed in the demo mode. The prompt may include notifying the user that placing the computing device in demo mode includes erasing the user-editable local memory region of the computing device.

In step 230, the computing device receives the user input indicating that the use wishes to place the computing device in the demo mode. For example, the computing device may receive an indication that the user selected the first button. Selecting the first button may include clicking a mouse at a position corresponding to the first button or touching a touch screen at a position corresponding to the first button.

In step 240, the computing device enters the demo mode responsive to the user input confirming that the user wishes to place the computing device in the demo mode. Entering the demo mode includes adjusting battery settings (e.g., battery settings 145) of the computing device. One example of battery settings corresponding to the demo mode is described with respect to FIG. 3. Entering the demo mode may include restarting an operating system of the computing device in the demo mode and/or erasing at least a portion of the local memory of the computing device. The determination as to what entering the demo mode entails may be made by a manufacturer of the computing device and stored in the demo mode module (e.g., demo mode module 130) of the computing device. In some cases, a computing device may have multiple demo modes, and a store owner or employee may select the demo mode corresponding to the store by programming equipment at the store to inform the computing device of the one of the multiple demo modes to enter or by notifying an operator of the cellular network (e.g. via a website) of the selected demo mode. The erased portion of the local memory of the computing device may include the user-editable local memory region (e.g., user-editable local memory region 140). At a later time, the computing device may exit the demo mode, and enter the consumer mode, in response to a factory reset of the computing device. The factory reset of the computing device may be done by a user of the computing device who enters an input (e.g., pressing one or more buttons) for causing the factory reset. This can be done, for example, if an owner or employee of the store decides to sell a demo device to a customer or donate the demo device to a charity that provides computing devices to poor people or school districts. The owner or employee of the store may make this decision, for example, in response to running out of inventory of computing device(s) similar (e.g., having a same make and model) to the demo device or in response to computing device(s) similar to the demo device becoming outdated and replaced by a newer model. After step 240, the process 200 ends.

After entering the demo mode and adjusting the battery settings of the computing device, as described in step 240 of the process 200, the computing device may determine that the computing device is connected to (e.g., plugged into) a charging station (e.g., charging station 190). The computing device may accordingly charge its battery. Upon determining that the battery of the computing device has reached (or exceeded) a first threshold battery charge level (e.g., 35% of full charge) the computing device may stop charging the battery. The first threshold charge level may be below 100% of full battery charge.

The computing device may discharge its battery responsive to use of the computing device that drains energy from the battery. Upon determining that the computing device has at most a second threshold battery charge (e.g., 30% of full charge), the computing device may charge its battery. The second threshold battery charge is greater than zero and is at least a predetermined difference below the first threshold battery charge level. The predetermined difference may be at least 5% of the full battery charge. When the computing device is connected to the charging station not being charged, the computing device may consume power for operating the computing device from the charging station. The computing device may consume power from the battery upon determining that the power from the charging station is insufficient. If the battery charge level is between the second threshold and the first threshold (e.g., between 30% and 35% of full charge) and the battery was previously being charged, charging may continue. Otherwise, charging may not begin until the battery charge level reaches the second threshold. In some cases, the first threshold, the second threshold, and/or the difference between the first threshold and the second threshold may be determined based on a preferred battery level, which may be provided by the manufacturer. For example, a manufacturer may indicate that the preferred battery level is between 35% and 45% of full charge. Based on this information, the first threshold may be set to 35% and the second threshold may be set to 45%.

Figure 3:
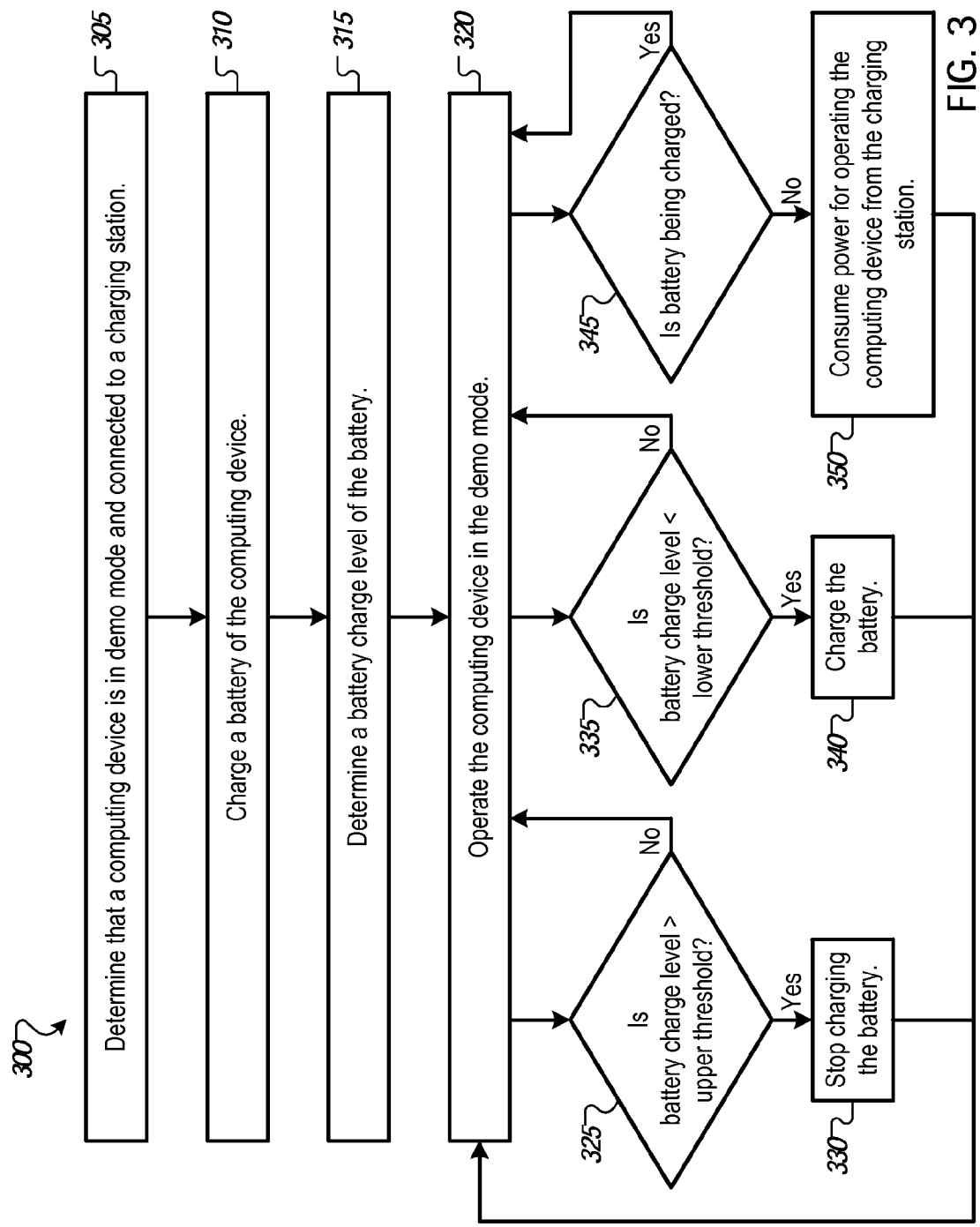
FIG. 3 is an exemplary process for managing a battery of a computing device.

FIG. 3 is an exemplary process 300 for managing a battery of a computing device. The process 300 begins at step 305, where the computing device (e.g., computing device 100) determines that the computing device is in a demo mode and connected to a charging station (e.g., charging station 195). For example, the computing device may detect that electricity is flowing to the computing device over a connection (e.g., connection 190) to the charging station.

In step 310, the computing device charges, using the charging station, a battery of the computing device. The battery may be charged by electricity flowing to the computing device over the connection. The connection may include a wire or a wireless connection to a wireless charger.

In step 315, the computing device determines a battery charge level of the battery. The computing device may measure an amount of charge stored in the battery and divide this amount by the maximum possible charge of the battery to determine the battery charge level. In some computing devices, the battery charge level is presented adjacent to an edge of a display.

In step 320, the computing device operates in the demo mode. The computing device may run application(s) associated with the demo mode or play video(s) associated with the demo mode. The application(s) or video(s) may be developed by the manufacturer of the computing device to highlight the key features of the computing device or to interest potential buyers in the computing device. After step 320, the process 300 continues to step 325, 335, or 345 depending on whether the battery charge level is greater than a first threshold (e.g., 35% of full charge), whether the battery charge level is less than a second threshold (e.g., 30% of full charge), or whether the battery is currently being charged.

In step 325, the computing device determines whether the battery charge level is greater than the first threshold. If so, the process 300 continues to step 330. If not, the process 300 returns to step 320. In step 330, upon determining that the battery charge level is greater than the first threshold, the computing device stops charging the battery. After step 330, the process 300 returns to step 320. It should be noted that, in some cases, the battery may not be drained after the computing device stops charging the battery. For example, the computing device may restart charging the battery after the battery charge level falls below the second threshold.

In step 335, the computing device determines whether the battery charge level is less than the second threshold. If so, the process 300 continues to step 340. If not, the process 300 returns to step 320. In step 340, upon determining that the battery charge level is less than the second threshold, the computing device charges the battery. After step 340, the process 300 returns to step 320. If the battery charge level is between the second threshold and the first threshold (e.g., between 30% and 35% of full charge) and the battery was previously being charged, charging may continue. Otherwise, charging may not begin until the battery charge level reaches the second threshold.

In step 345, the computing device determines whether the battery is being charged. If so, the process 300 returns to step 320. If not, the process 300 continues to step 350. In step 350, upon determining that the battery is not being charged, the computing device consumes power for operating the computing device from the charging station. The computing device consumers power from the battery upon determining that the power from the charging station is insufficient. After step 350, the process 300 returns to step 320. While the battery is being charged, the power for operating the computing device may come from either the battery or the charging station.

Some examples of the subject technology include the computing device enabling and/or disabling charging of the battery while the computing device is connected to a charging station. The enabling and/or disabling may be completed by software that enables and/or disables the charging of the battery. For example, an application programming interface (API) may expose the battery charging functionality to a software programmer, such as a programmer programming the demo mode interface for the computing device.

Some examples of the subject technology include the computing device entering a demo mode. In some cases, the demo mode may be preprogrammed into the computing device. In other cases, upon entering the demo mode, the computing device may download, using a network, a demo mode interface from an application server. An example of a network that includes an application server connected to a computing device (e.g., a mobile station) is described herein in conjunction with FIG. 4. Examples of the application server are described herein in conjunction with FIGS. 7 and 8.

Figure 4:
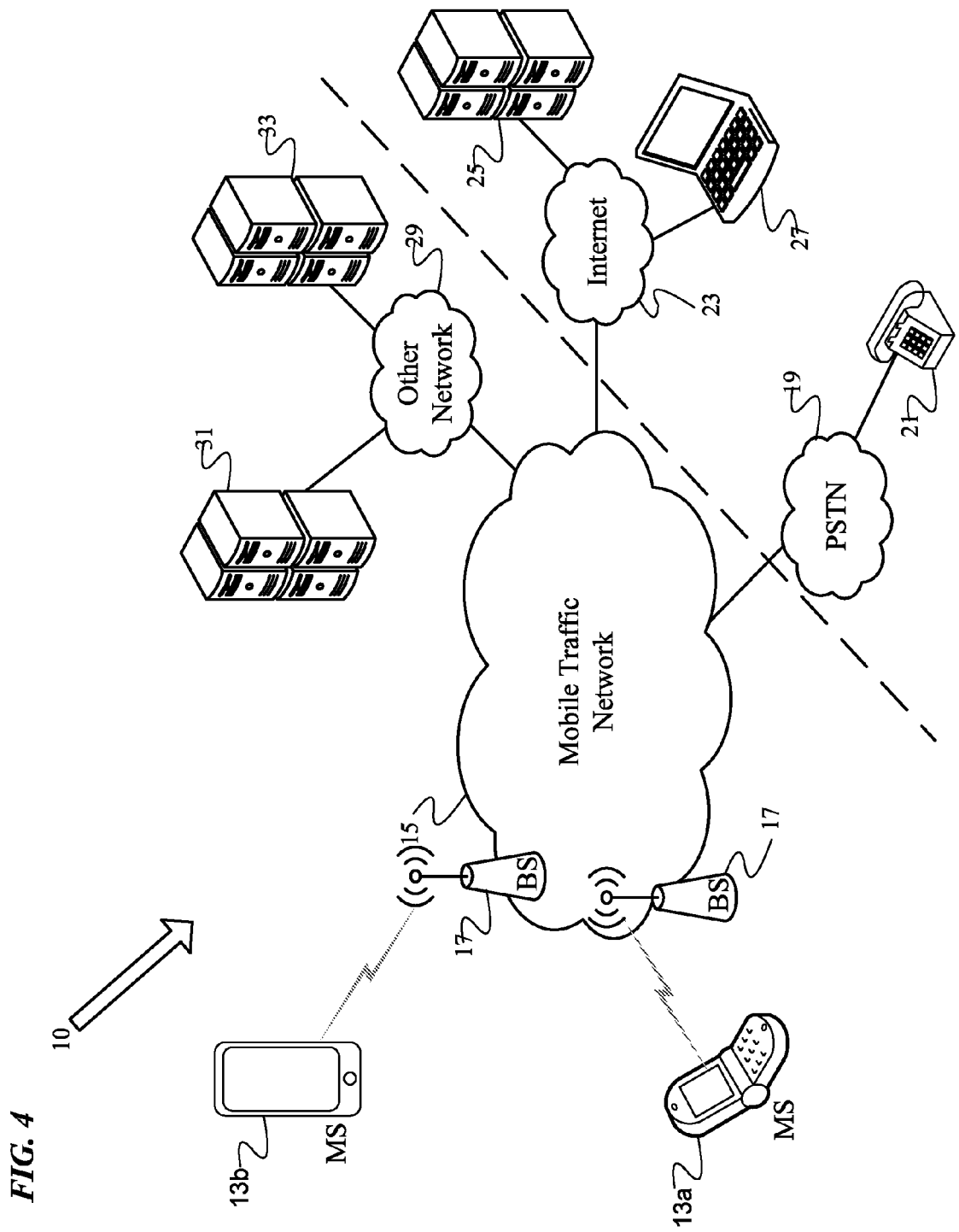
FIG. 4 is a high-level functional block diagram of an exemplary system of networks/devices that provide various communications for mobile stations for which a demo mode may be implemented.

FIG. 4 illustrates an exemplary system 10 offering a variety of mobile communication services. The example shows simply two mobile stations (MSs) 13*a* and 13*b* as well as a mobile communication network 15. The mobile stations 13*a* and 13*b* are examples of mobile stations, which may correspond to the computing device 100. The network 15 provides mobile wireless communications services to those stations as well as to other mobile stations (not shown), for example, via a number of base stations (BSs) 17. Each of the mobile stations 13a and 13b may correspond to a mobile station configured to operate in the demo mode and the consumer mode, such as the computing device 100. The present techniques may be implemented in or used in any of a variety of available mobile networks 15 or non-mobile networks 23 or 29, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, the Universal Mobile Telecommunications System (UMTS) standard, the LTE standard belonging to 3GPP or other standards used for public mobile wireless communications. The mobile stations 13 may be capable of voice telephone communications through the network 15. Alternatively or additionally, the mobile stations 13a and 13b may be capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13 via the Internet 23 may be with devices like those shown at 25 and 27 as well as with a variety of other types of devices or systems capable of data communications through various interconnected networks.

Mobile stations 13 can take the form of portable handsets, smart-phones or personal digital assistants, although they may be implemented in other form factors. Program applications can be configured to execute on many different types of mobile stations 13. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31.

A mobile station 13 communicates over the air with a base station 17 and through the traffic network 15 for various voice and data communications, e.g. through the Internet 23 with a server 25 and/or with application servers 31. Services offered by the mobile service carrier may be hosted on a carrier operated application server 31, for communication via the networks 15 and 29. Server such as 25 and 31 may provide any of a variety of common application or service functions in support of or in addition to an application program running on the mobile station 13. For a given service, an application program within the mobile station may be considered as a 'client' and the programming at 25 or 31 may be considered as the 'server' application for the particular service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile station 13, the server application provides appropriate information to the authentication server 33 to allow server application 33 to authenticate the mobile station 13 as outlined herein. Upon successful authentication, the server 33 informs the server application 31, which in turn provides access to the service via data communication through the various communication elements (e.g. 29, 15 and 17) of the network 10.

The subject technology may be implemented in conjunction with touch screen type mobile stations as well as to non-touch type mobile stations. Hence, our simple example shows the mobile station (MS) 13*a* as a non-touch type mobile station and shows the mobile station (MS) 13 as a touch screen type mobile station. Some implementation may involve at least some execution of programming in the mobile stations as well as implementation of user input/output functions and data communications through the network 15, from the mobile stations. Those skilled in the art presumably are familiar with the structure, programming and operations of the various types of mobile stations. However, for the sake of completeness two types of mobile stations are described below with respect to FIGS. 5 and 6.

As shown by the above discussion, functions relating to MMS communication may be implemented on computers connected for data communication via the components of a packet data network, as shown in FIG. 4. For example, the computing device 100 may correspond to the mobile station 13*a* or the mobile station 13*b*. Although special purpose devices may be used, such devices also may be implemented using one or more hardware platforms intended to represent a general class of data processing device commonly used to run "server" programming so as to implement the functions discussed above, albeit with an appropriate network connection for data communication.

Figure 6:
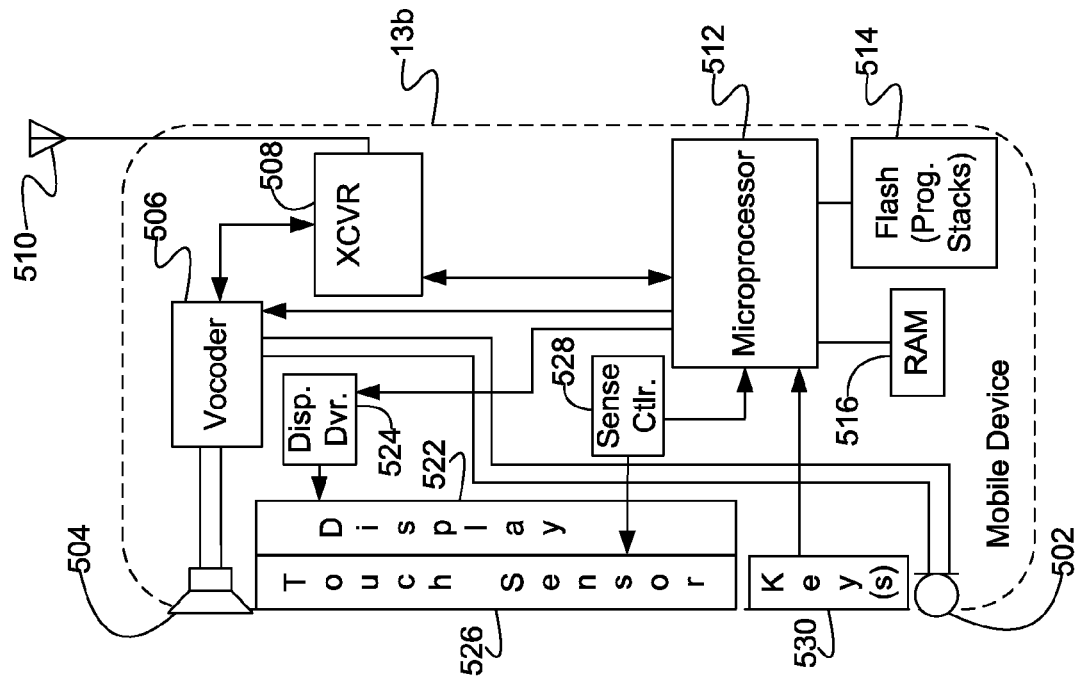
FIG. 6 is a high-level functional block diagram of an exemplary touch screen type mobile station which may be configured to operate in a demo mode and a consumer mode.
Figure 5:
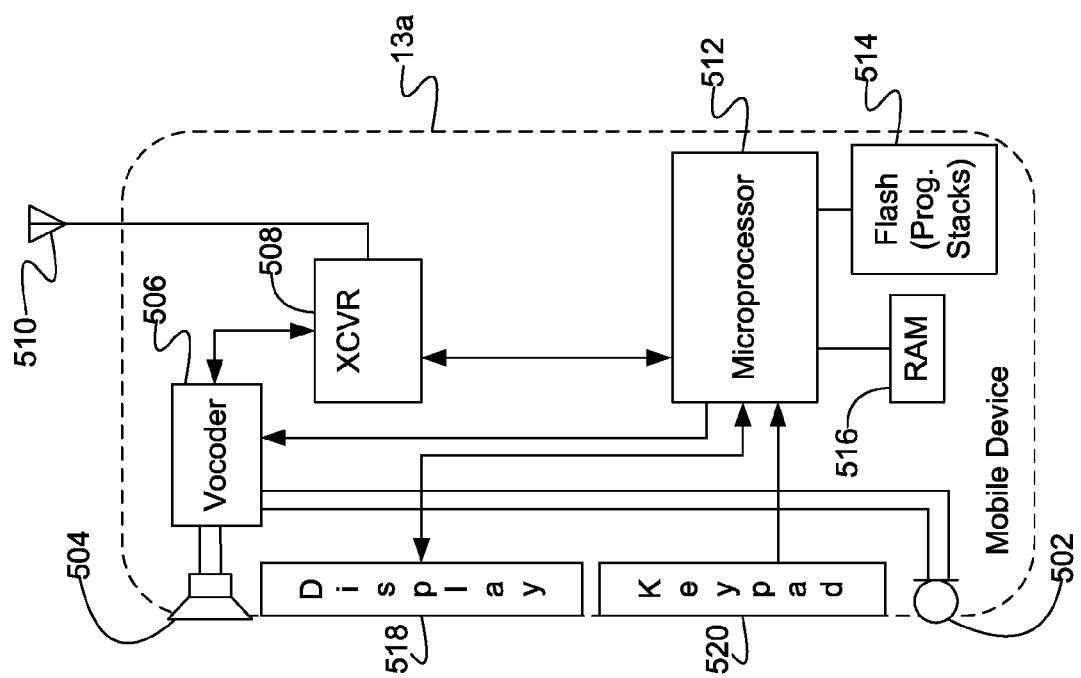
FIG. 5 is a high-level functional block diagram of an exemplary non-touch type mobile station, which may be configured to operate in a demo mode and a consumer mode.

The mobile stations of FIGS. 5 and 6 may correspond to the mobile station 105. FIG. 5 illustrates exemplary non-touch type mobile station. FIG. 6 illustrates an exemplary touch screen type mobile station.

FIG. 5 provides a block diagram illustration of an exemplary non-touch type mobile station 13*a*, which may correspond to the mobile station 13. Although the mobile station 13*a* may be a smart-phone or may be incorporated into another device, such as a personal digital assistant (PDA) or the like, for discussion purposes, the illustration shows the mobile station 13*a* is in the form of a handset. The handset embodiment of the mobile station 13*a* functions as a normal digital wireless telephone station. For that function, the mobile station 13*a* includes a microphone 502 for audio signal input and a speaker 504 for audio signal output. The microphone 502 and speaker 504 connect to voice coding and decoding circuitry (vocoder) 506. For a voice telephone call, for example, the vocoder 506 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile station 13*a* also includes at least one digital transceiver (XCVR) 508. The mobile station 13*a* may be configured for digital wireless communications using one or more of the common network technology types. The concepts discussed here encompass embodiments of the mobile station utilizing any digital transceivers that conform to current or future developed digital wireless communication standards. The mobile station may also be capable of analog operation via a legacy network technology.

The transceiver 508 provides two-way wireless communication of information, such as vocoded speech samples and/or digital information, in accordance with the technology of the network 165. The transceiver 508 also sends and receives a variety of signaling messages in support of the various voice and data services provided via the mobile station 13*a* and the communication network. Each transceiver 508 connects through RF send and receive amplifiers (not separately shown) to an antenna 510. The transceiver may also support various types of mobile messaging services, such as short message service (SMS), enhanced messaging service (EMS) and/or multimedia messaging service (MMS).

The mobile station 13*a* includes a display 518 for displaying messages, menus or the like, call related information dialed by the user, calling party numbers, etc. A keypad 520 enables dialing digits for voice and/or data calls as well as generating selection inputs, for example, as may be keyed-in by the user based on a displayed menu or as a cursor control and selection of a highlighted item on a displayed screen. The display 518 and keypad 520 are the physical elements providing a textual or graphical user interface. Various combinations of the keypad 520, display 518, microphone 502 and speaker 504 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections.

A microprocessor 512 serves as a programmable controller for the mobile station 13*a*, in that it controls all operations of the mobile station 13*a* in accordance with programming that it executes, for all normal operations, including those under consideration here. In the example, the mobile station 13*a* includes flash type program memory 514, for storage of various "software" or "firmware" program routines and mobile configuration settings, such as mobile directory number (MDN) and/or mobile identification number (MIN), etc. The flash type program memory 514 stores programmed instructions, including those described herein. The mobile station 13*a* may include a non-volatile random access memory (RAM) 516 for a working data processing memory. Of course, other storage devices or configurations may be added to or substituted for those in the example. In a present implementation, the flash type program memory 514 stores firmware such as a boot routine, device driver software, an operating system, call processing software and vocoder control software, and any of a wide variety of other applications, such as client browser software and short message service software. The memories 514, 516 also store various data, such as telephone numbers and server addresses, downloaded data such as multimedia content, and various data input by the user. Programming stored in the flash type program memory 514, sometimes referred to as "firmware," is loaded into and executed by the microprocessor 512.

As outlined above, the mobile station 13*a* includes a processor, and programming stored in the flash memory 514 configures the processor so that the mobile station is capable of performing various desired functions, including those described herein.

For purposes of such a discussion, FIG. 6 provides a block diagram illustration of an exemplary touch screen type mobile station 13*b*. Although possible configured somewhat differently, at least logically, a number of the elements of the exemplary touch screen type mobile station 13*b* are similar to the elements of mobile station 13*a*, and are identified by like reference numbers in FIG. 6. For example, the touch screen type mobile station 13*b* includes a microphone 502, speaker 504 and vocoder 506, for audio input and output functions, much like in the earlier example. The mobile station 13*b* also includes at least one digital transceiver (XCVR) 508, for digital wireless communications, although the mobile station 13b may include an additional digital or analog transceiver. The concepts discussed here encompass embodiments of the mobile station 13b utilizing any digital transceivers that conform to current or future developed digital wireless communication standards. As in the mobile station 13a, the transceiver 508 provides two-way wireless communication of information, such as vocoded speech samples and/or digital information, in accordance with the technology of the network 165. The transceiver 508 also sends and receives a variety of signaling messages in support of the various voice and data services provided via the mobile station 13b and the network 165. Each transceiver 508 connects through RF send and receive amplifiers (not separately shown) to an antenna 510. The transceiver may also support various types of mobile messaging services, such as short message service (SMS), enhanced messaging service (EMS) and/or multimedia messaging service (MMS).

As in the example of the mobile station 13a, a microprocessor 512 serves as a programmable controller for the mobile station 13b, in that it controls all operations of the mobile station 13b in accordance with programming that it executes, for all normal operations, and for operations described herein. In the example, the mobile station 13b includes flash type program memory 514, for storage of various program routines and mobile configuration settings. The mobile station 13b may also include a non-volatile random access memory (RAM) 516 for a working data processing memory. Of course, other storage devices or configurations may be added to or substituted for those in the example. Hence, outlined above, the mobile station 13b includes a processor, and programming stored in the flash memory 514 configures the processor so that the mobile station is capable of performing various desired functions, including the functions described herein.

In the example of FIG. 6, the user interface elements included a display and a keypad. The mobile station 13b may have a limited number of key(s) 530, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13b includes a display 522, which the microprocessor 512 controls via a display driver 524, to present visible outputs to the device user. The mobile station 13b also includes a touch/position sensor 526. The sensor 526 is relatively transparent, so that the user may view the information presented on the display 522. A sense circuit 528 sensing signals from elements of the touch/position sensor 526 and detects occurrence and position of each touch of the screen formed by the display 522 and sensor 526. The sense circuit 528 provides touch position information to the microprocessor 512, which can correlate that information to the information currently displayed via the display 522, to determine the nature of user input via the screen.

The display 522 and touch sensor 526 (and possibly one or more keys 530, if included) are the physical elements providing the textual and graphical user interface for the mobile station 13b. The microphone 502 and speaker 504 may be used as user interface elements for audio input and output.

The structure and operation of the mobile stations 13a and 13b, as outlined above, were described to by way of example, only.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. In operation, the code is stored within the general-purpose computer platform. At other times, however, the software may be stored at other locations and/or transported for loading into the appropriate general-purpose computer system. Execution of such code by a processor of the computer platform enables the platform to implement the methodology described herein.

Figure 7:
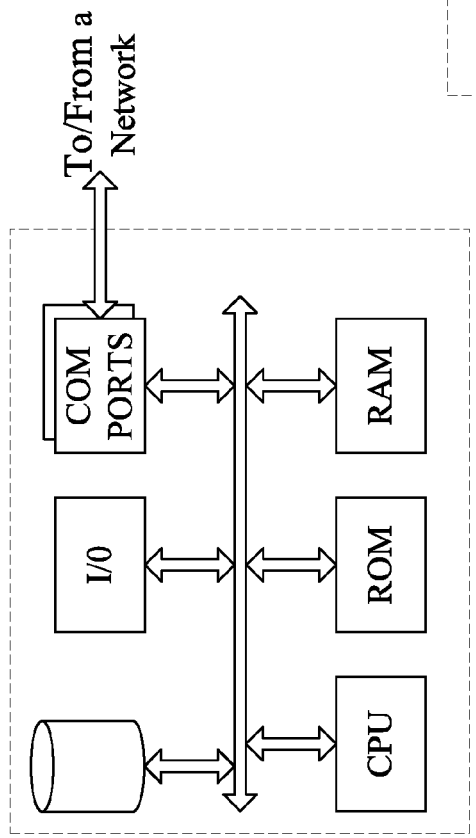
FIG. 7 is a simplified functional block diagram of a computer that may be configured to function a server computing device.
Figure 8:
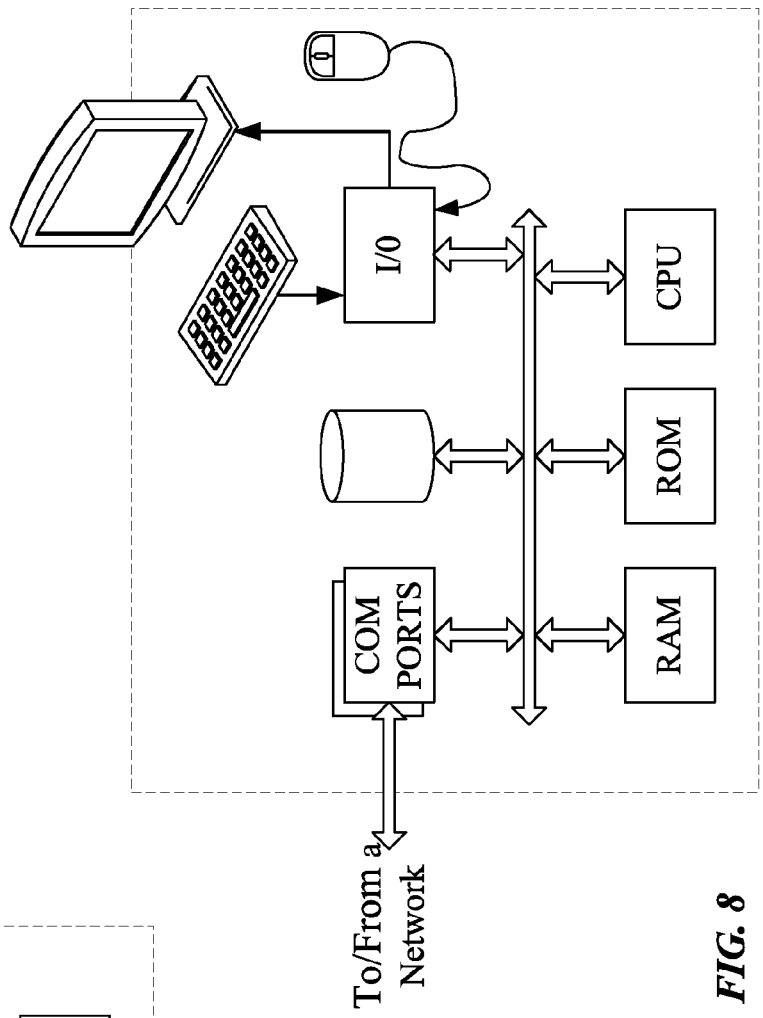
FIG. 8 is a simplified functional block diagram of a personal computer or other work station or terminal device, which may be configured to function as the server computing device.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. It is believed that the general structure and general operation of such equipment as shown in FIGS. 7 and 8 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIGS. 7 and 8). A mobile station type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the methods of determining an action plan with respect to a returned device outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the demo/consumer switching module 125, the demo mode module 130, the consumer mode module 135, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a Blu-ray disc read-only memory (BD-ROM), CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

These general and specific aspects may be implemented using a system, a method, a computer program, a computer readable medium, or an apparatus or any combination of systems, methods, computer programs, computer readable mediums, and/or apparatuses While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and may be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, should may they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, at a computing device, a first input for entering a demo mode;
   prompting, in response to the first input, for a user input indicating whether the user wishes to place the computing device in the demo mode;
   receiving the user input indicating that the user wishes to place the computing device in the demo mode; and
   entering the demo mode of the computing device responsive to the user input indicating that the user wishes to place the computing device in the demo mode, wherein entering the demo mode includes adjusting battery settings of the computing device.

2. The method of claim 1, wherein the first input is received via a radio of the computing device.

3. The method of claim 1, wherein entering the demo mode further includes:
   restarting an operating system of the computing device in the demo mode; and
   erasing at least a portion of a local memory of the computing device.

4. The method of claim 1, wherein the first input comprises a cellular signal from a pico cell environment associated with a retail store.

5. The method of claim 1, wherein the first input comprises a preset security code for unlocking a user interface of the computing device.

6. The method of claim 1, wherein the first input comprises a near field communication (NFC) radio signal.

7. The method of claim 1, wherein the first input comprises a new subscriber identity module (SIM) card inserted into the computing device, the new SIM card comprising an indication that the computing device is to be placed in the demo mode.

8. The method of claim 1, wherein the first input comprises a beacon signal from a beacon device.

9. The method of claim 1, further comprising exiting the demo mode in response to a factory reset of the computing device.

10. The method of claim 1, wherein adjusting the battery settings of the computing device comprises determining, after entering the demo mode, that the computing device is connected to a charging station.

11. The method of claim 10, wherein adjusting the battery settings of the computing device further includes:
    charging a battery of the computing device; and
    upon determining that the battery of the computing device is at or above a first threshold battery charge level, stopping charging the battery, wherein the first threshold battery charge level is below 100% of full battery charge.

12. The method of claim 11, wherein adjusting the battery settings of the computing device further includes:
    discharging the battery responsive to use of the computing device; and
    upon determining that the computing device is at or below a second threshold battery charge level, charging the battery, wherein the second threshold battery charge level is at least a predetermined difference below the first threshold battery charge level.

13. The method of claim 10, wherein adjusting the battery settings of the computing device further includes:
    upon determining that the computing device is not being charged, permitting the computing device to consume power for operating the computing device from the charging station, and permitting the computing device to consume power from the battery upon determining that the power from the charging station is insufficient.

14. A method comprising:
    determining that a computing device is in a demo mode and connected to a charging station;
    charging, using the charging station, a battery of the computing device;
    determining a battery charge level of the battery; and
    in response to determining that the computing device is in the demo mode and connected to the charging station:
      stopping charging the battery if the battery charge level is at least a first threshold battery charge level, stopping charging the battery, wherein the first threshold battery charge level is below 100% of full battery charge;
      charging the battery if the battery charge level is at most a second threshold battery charge level, wherein the second threshold battery charge level is at least a predetermined difference below the first threshold battery charge level; and
      consuming power for operating the computing device from the charging station, and consuming power from the battery upon determining that the power from the charging station is insufficient if the computing device is connected to the charging station and not being charged.

15. The method of claim 14, wherein the first threshold battery charge level is 35% of full battery charge, and wherein the second threshold battery charge level is 30% of full battery charge.

16. The method of claim 14, wherein the predetermined difference is at least 5% of full battery charge.

17. The method of claim 14, wherein the first threshold battery charge level, the second threshold battery charge level, or the predetermined difference are provided by a manufacturer of the computing device or a manufacturer of the battery based on a preferred battery charge level of the battery.

18. A computing device comprising:
    one or more processors; and
    a memory comprising instructions which, when executed by the one or more processors, cause the one or more processors to:
      receive a first input for entering a demo mode;
      prompt, in response to the first input, for a user input indicating whether the user wishes to place the computing device in the demo mode;
      receive the user input indicating that the user wishes to place the computing device in the demo mode; and
      enter the demo mode of the computing device responsive to the user input indicating that the user wishes to place the computing device in the demo mode, wherein entering the demo mode includes adjusting battery settings of the computing device.

19. The computing device of claim 18, wherein the first input is received via a radio of the computing device.

20. The computing device of claim 18, wherein the first input comprises a beacon signal from a beacon device.

* * * * *